Nov. 21, 1944. G. A. FINGADO ET AL Re. 22,561
METHOD AND MACHINE FOR TREATING THIN RUBBER ARTICLES
Original Filed July 1, 1939 2 Sheets-Sheet 1
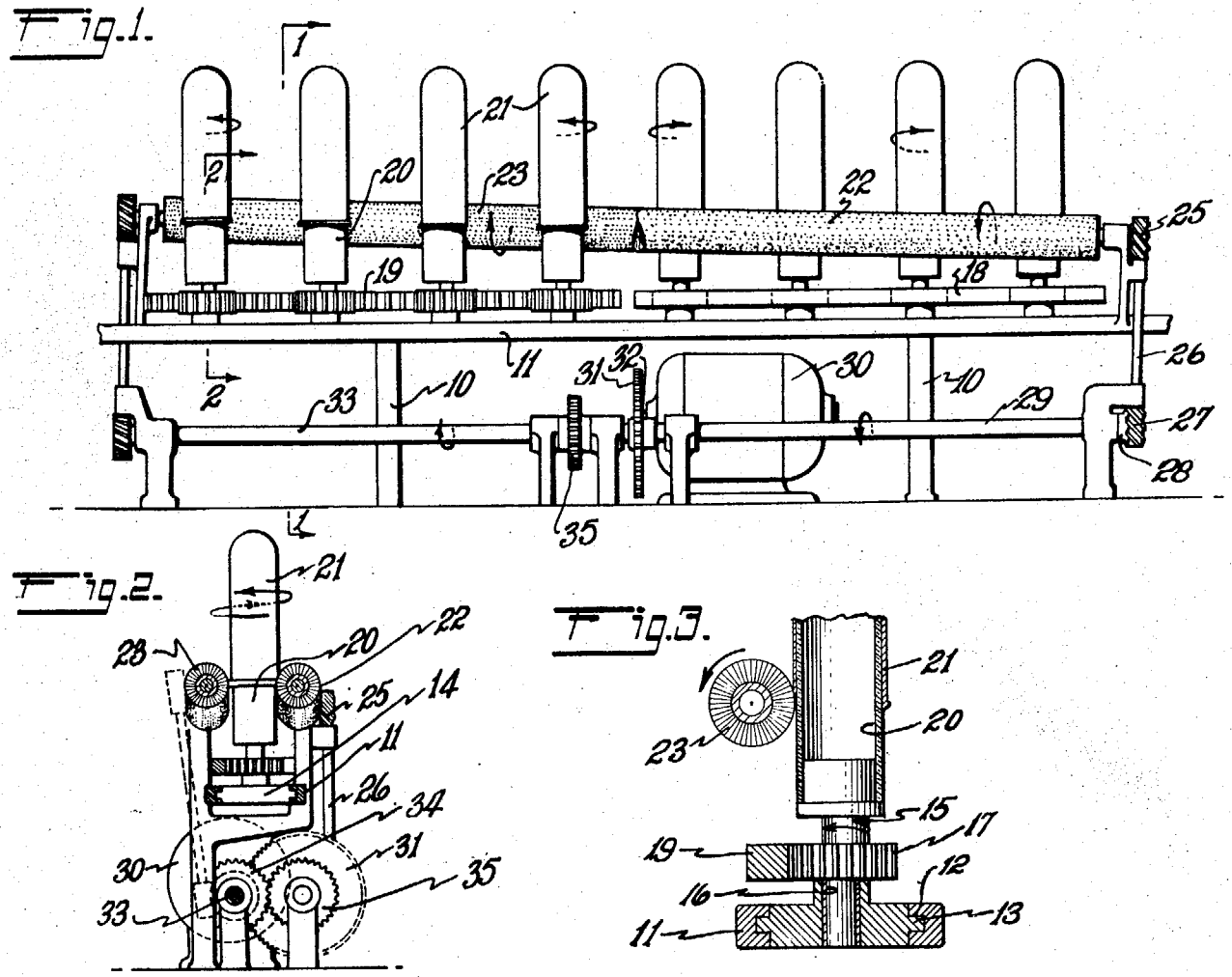
INVENTORS
GUSTAV A. FINGADO
AND HANS LUDWIG
BY Joseph L. Montgomery
ATTORNEY

METHOD AND MACHINE FOR TREATING THIN RUBBER ARTICLES

Original Filed July 1, 1939 2 Sheets-Sheet 2

INVENTORS
GUSTAV A FINGADO
AND HANS LUDWIG
BY
Cecil Montgomery
ATTORNEY

Reissued Nov. 21, 1944

Re. 22,561

UNITED STATES PATENT OFFICE 22,561

METHOD AND MACHINE FOR TREATING THIN RUBBER ARTICLES

Gustav A. Fingado, Little Falls, and Hans Ludwig, Hohokus, N. J., assignors to Julius Schmid, Inc., New York, N. Y.

Original No. 2,249,755, dated July 22, 1941, Serial No. 282,448, July 1, 1939. Application for reissue May 18, 1944, Serial No. 536,148

7 Claims. (Cl. 18—2)

The present invention relates to the manufacture of rubber goods and more particularly to the method of beading rubber articles, such for example as nipples or stalls for the protection of the injured fingers, etc.

In the manufacture of articles of the character indicated a beading is formed at the open end of the article to provide a reinforcing finish for the article.

Heretofore the art of making such articles consists in dipping a form, sometimes called a mandrel or bottle, in a solution of rubber, latex or the like a sufficient number of times, or for a sufficient period of time, depending upon the thickness of the article desired, after which the form with the rubber film thereon is removed from the dip and while the rubber film is still soft and tacky and on the form, rolling the open end of the article upon itself to form a bead or beading. The practice heretofore in forming the bead has been to rotate the form continuously in one direction in contact with a rotating brush which rolls the open end of the article upon itself to form the bead. By this method it has been found that upon removing the article from the form the bead is distorted and takes the form of a figure 8.

When the beading is distorted into a figure 8, as mentioned, the article is rendered objectionable in several respects. Articles of the character indicated after removal from the form are powdered on the inside and outside, as is well known in this art, to prevent adherence of the walls to each other. With the figure 8 formation of the beading it is practically impossible properly to powder the inside of the article and also practically impossible to turn the article inside out as is sometimes done by hand. As is well known in this art the powdering more generally is carried out by mechanical means such as a tumbling barrel wherein the articles are placed, together with the powder, and by means of compressed air the articles are blown about within the barrel with the powder whereby the powder contacts both the inside and outside of the articles. When the beading at the mouth of the article is in the form of a figure 8 the mouth is closed and by reason of the article being in a tacky condition the walls adhere to each other whereby, even under the pressure of the air, powder can not enter the article.

Moreover, when the beading is in the formation of a figure 8 the articles are difficult of application in use. For example it will be appreciated that with a finger cot or stall having a figure 8 bead it is necessary first to open the bead and retain the same open in applying the stall to the finger. Retaining the bead open during application will require the use of both hands and therefore the person with the injured finger will be required to call upon another for assistance.

It is an object of the present invention to provide a method and apparatus whereby articles of the character designated can readily be manufactured in mass production with a circular beading, which has not heretofore been possible with machines wherein the beading is formed by rotating the article carrying form in a single direction.

For a fuller and more detailed understanding of the invention, reference should be had to the following specification taken in connection with the following drawings, in which:

Figure 1 is a side elevation of a machine embodying the invention.

Figure 2 is a sectional view taken along the line 2—2 of Figure 1.

Figure 3 is a fragmentary sectional view taken along the line 3—3 of Figure 1.

Figure 4:
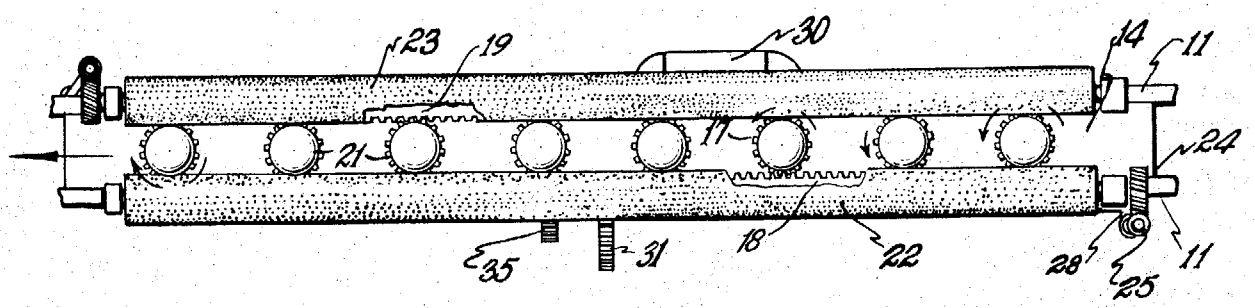
Figure 4 is a plan view similar to Figure 1.
Figure 5:
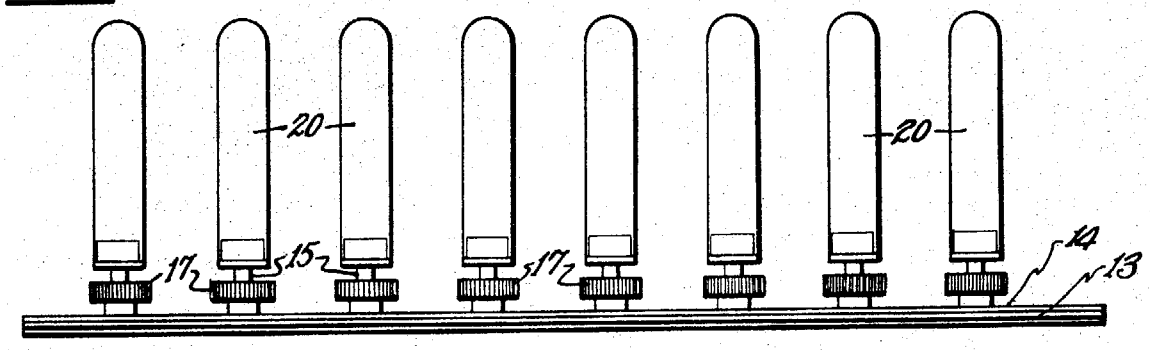
Figure 5 is a side elevation of the traveler which supports the spindles.

Referring now to the drawings 1–5 inclusive the machine may be seen to consist in a supporting frame 10. Suitably fastened to the frame 10 are a pair of tracks 11. The tracks 11 have grooves 12 cut in their inner edges to support the tongues 13 of a traveler 14. The traveler 14 carries at spaced distances a number of spindles 15 suitably mounted for rotation in bushings 16. Mounted upon the spindles 15 are the pinions 17, so placed as to engage and mesh with a rack gear 18 as the traveler 14 moves along the tracks 11. Moving from right to left in Figure 1 it may be seen that the spindles 15 are thus given a counterclockwise rotation at the start, as the pinions 17 disengage the rack 18 they engage and mesh with the rack gear 19, thus having imparted to them a clockwise rotation.

The spindles 15 are adapted to support and rotate a set of glass bottles 20, upon which a suitable coating of rubber latex 21 has been deposited by dipping in a latex bath, as these latex coated glass bottles pass along the tracks 11, they are rotated in one direction by the action of the pinions 16 on the rack gear 18, and then in the other by the action of the rack gear 19. A rapidly rotating brush 22 is set in such a position as to contact and brush upward on one side of the bottles 20 while they rotate counter-clockwise, and a second brush 23 is so placed as to contact the bottles upon the opposite side when they rotate clockwise.

The brush 22 may be driven in any suitable manner, that shown being a gear train consisting in the helical gears 24 and 25. The gear 25 being driven by a shaft 26, which in turn is driven by a helical gear 27 meshing with a gear 28. The gear 28 is supported and driven by a shaft 29 which in turn receives energy from a motor 30 through the gears 31 and 32. A similar train of gears drive the brush 23 from a shaft 33 rotating in the opposite direction to the shaft 29 due to its driving connection thru the gears 34 and 35.

The operation of the above described machine is very simple. The glass bottles 20 with their latex coating 21 are placed upon the spindles 15 on the traveler 14. The traveler 14 is placed in the tracks 11 and moved from right to left thru the machine, in so doing the bottles 20 are first rotated counterclockwise. The brush 22 brushes the latex coating at its lower edge upward as the bottle turns. The bottle 20 then rotates in the opposite direction, and the latex coating is brushed up from the opposite side by the brush 23, this second brushing neutralizes the effect of the first brushing making a satisfactory beading.

If the latex coating 21 were to be peeled from the bottle 20 before the second brush 23 could act upon it, the beading would distort into a figure 8, this objection is overcome by the action of the second brush 23 operating upon the coating in the opposite way to the brush 22.

It is desired that the foregoing description be taken purely in an illustrative sense and not held to limit the scope of the invention.

Having now fully described the invention, the part which it is wished to protect by Letters Patent will be set forth in the accompanying claims.

What we claim is:

1. A method of beading the open end of a spreadable rubber film which is located on a mandrel, which consists in turning the mandrel around its longitudinal axis in opposite directions, while wiping the rubber film longitudinally relative to the mandrel so as to form a beaded edge at said open end.

2. A machine for beading the open end of a spreadable rubber film comprising a mandrel for the film rotatable about its longitudinal axis, means for rotating the mandrel in opposite directions and means for wiping the film longitudinally relative to the mandrel during said rotation of the mandrel to form a beaded edge at said open end.

3. In a machine of the character described, a pair of parallel rotating bead forming devices, a plurality of forms carrying a thin coating of rubber, means for advancing the forms longitudinally between and in contact with the bead forming devices for wiping the film longitudinally relative to the form, and means in the path of said forms adapted to be engaged by the forms for rotating the same alternately in opposite directions during said wiping operation to form the bead.

4. In a bead forming machine, a pair of parallel rotatable bead forming rolls, form boards, a plurality of forms rotatably mounted on said boards and each carrying an article to be beaded, means for advancing the form boards along the rolls with the articles on the forms simultaneously in contact with both rolls, a gear on each of said forms, and staggered racks on opposite sides of the forms and adapted to be engaged by said gears for alternately rotating the forms in opposite directions for the purpose specified.

5. A method for forming a bead on the open end of a spreadable thin rubber film which is located on a mandrel which method consists in alternately rotating the mandrel about its longitudinal axis in opposite directions and while the film is in a tacky condition on the mandrel contacting the film with a bead-forming element to thereby wipe the film longitudinally relative to the mandrel to roll a portion of the open end of the film upon itself to form a beaded edge at said open end.

6. A method for forming a bead on the open end of a spreadable thin rubber film which is formed on a mandrel, which method consists in rotating the mandrel while the rubber film is in a tacky condition first in one direction in contact with a bead-rolling element, wiping the film with said element longitudinally relative to the mandrel to roll the film upon itself to partly form a bead and then rotating the mandrel in the opposite direction in contact with the bead-rolling element, and continuing wiping of the film with said element longitudinally relative to the mandrel until the bead is completely formed.

7. A method of forming a bead on the open end of a spreadable article of thin rubber film which method consists in rotating the mandrel about its longitudinal axis in one direction while conveying it in a path substantially at right angles to its longitudinal axis between and in simultaneous contact with parallel rotating rolls to wipe the film longitudinally relative to the mandrel until a bead is partly rolled in said film, and then rotating the form in the opposite direction while in contact with said rolls to continue wiping of the film longitudinally of the mandrel until the bead is completely formed.

GUSTAV A. FINGADO.
HANS LUDWIG.